June 19, 1956 J. F. DOBOSY 2,751,445

VIDEO SIGNAL MIXING AMPLIFIER CIRCUITS

Filed Jan. 12, 1953

INVENTOR.
JOSEPH F. DOBOSY

BY Otto J. Mitchell

ATTORNEY

United States Patent Office 2,751,445

Patented June 19, 1956

2,751,445

VIDEO SIGNAL MIXING AMPLIFIER CIRCUITS

Joseph F. Dobosy, Avon Lake, Ohio, assignor to Radio Corporation of America, a corporation of Delaware Application January 12, 1953, Serial No. 330,866

The terminal 15 years of the term of the patent to be granted has been disclaimed.

2 Claims. (Cl. 179—171)

This invention relates to signal amplifier circuits, and more particularly to video signal mixing amplifier circuits.

In the transmission of television signals, or the like, it is frequently desirable to derive a composite television signal from more than one video signal source by mixing suitable amounts of the individual video signals. Also, often it is desirable to change from one source of video signals to another source of video signals gradually so that at the beginning of the operation the transmitted signal is a video signal from one video signal source, during the change, the signal is a composite made up of varying proportions of the signals from both video signal sources, and at the end of the operation the video signal transmitted is the video signal from the second video signal source. The operation of sending a composite television signal is commonly known as mixing and the operation of gradually changing from one video signal to another is known as a lap-dissolve.

One electronic method of mixing or lap-dissolving two or more video signals contemplates the use of a plurality of electron tubes all of which are connected to either a common load resistance or a common cathode resistance. Each of the individual video signals is applied to a control electrode of one of the electron tubes along with a variable D.-C. biasing potential for controlling the conduction in the electron tube. The variable biasing means is normally arranged so as to increase conduction in one tube and decrease conduction in the other at the same time where two video signals are to be mixed or lap-dissolved. With conduction in one electron tube increasing while the conduction in the other electron tube is decreasing, the total current flowing through the common load resistance or common cathode resistance tends to remain constant. Assuming two electron tubes having absolutely linear characteristics, the conduction in one electron tube might be arranged to increase by the same amount the conduction in the second electron tube is decreased, thereby providing a constant current through the load. However, as is well known, the characteristic curves of electron tubes are not absolutely linear. This nonlinearity produces a transient voltage across the load when the portions of the video signals being mixed are changed or a lap dissolve operation takes place quickly.

The reduction of these transient voltages to a magnitude of a few percent of the video level is fundamental to the success of mixing or lap-dissolve devices. The frequencies of these transient voltages are in a range which overlaps the lower video frequencies. Therefore, they are transmitted and amplified along with the video signals in normal video amplifiers. As a result, an effect which has come to be known as "bounce" is observed on the device reproducing the picture information. This sometimes resembles a surge in brightness.

The object of this invention is to provide an improved television system wherein any voltage transient resulting from rapid changes in gain, switching, mixing, or lap dissolving is reduced to a minimum.

Another object of this invention is to provide means for compensating a mixing or lap dissolving device whereby low frequency transient voltages are substantially eliminated from the output.

An additional object of this invention is to compensate a video signal amplifier so that low frequency transient voltages are attenuated.

According to this invention, a signal amplifier is provided with means for attenuating transient low frequency disturbances comprising a glow discharge device coupled from the anode circuit to the input circuit.

Other and incidental objects of this invention will become apparent upon a reading of the following specification and an inspection of the drawings, in which.

Figures 1, 2, 3:
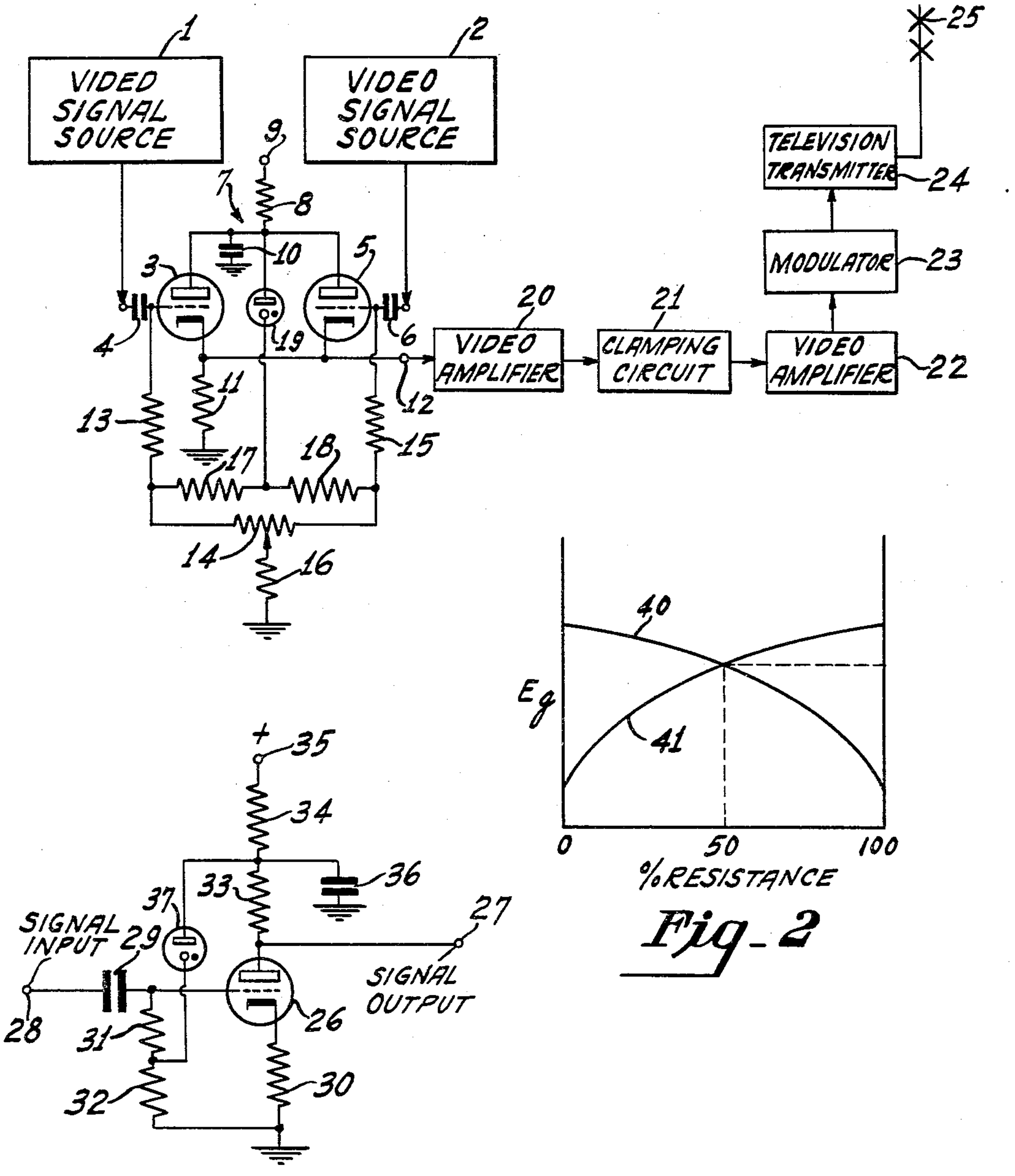
Figure 1 is a combination block and circuit diagram of a television system including an embodiment of the present invention.
Figure 2 is a graphical illustration of some of the relationships occuring in the embodiment of Figure 1.
Figure 3 is a circuit diagram of an alternative embodiment of the present invention.

Turning now in more detail to Figure 1, two video signal sources 1 and 2 are provided. The video signal from one video signal source 1 is coupled to the control electrode of electron tube 3 by means of a coupling capacitance 4, and in like manner the video signals from another video signal source 2 are coupled to the control electrode of electron tube 5 by means of a coupling capacitance 6. The electron tubes 3 and 5, along with their associated circuitry to be described presently, form a portion of the lap-dissolve device indicated generally by the numeral 7.

Both the anode of electron tube 3 and the anode of electron tube 5 are connected to one end of a resistance 8 which has its other end connected to a suitable source of positive operating potential by means of terminal 9. The anodes of electron tubes 3 and 5 also are coupled to ground reference potential by means of capacitance 10. The cathodes of electron tubes 3 and 5 are connected to ground reference potential through a common cathode resistance 11. The output appearing at terminal 12 is taken from across this common cathode resistance 11 in the fashion of a cathode follower. The biasing network comprises a resistance 13, a potentiometer 14, and a resistance 15 connected serially between the control electrode of electron tube 3 and the control electrode of electron tube 5. A movable contact on the potentiometer 14 is connected to ground reference potential through a resistance 16. Resistances 17 and 18 are connected in series parallel with the potentiometer 14. A glow discharge device, such as for example, a voltage regulator tube 19 is connected between the anodes of electron tubes 3 and 5 and the serial connection between resistances 17 and 18. The glow discharge tube 19 should be one that is capable of conducting in the circuit during steady state conditions with no video signals applied to the lap-dissolve device 7.

Considering the steady state operation of the circuit for the present, and assuming that the variable tap on the potentiometer 14 is at mid-position; it will be apparent that the biasing potential applied to the control electrode of electron tube 3 is equal to the biasing potential applied to the control electrode of electron tube 5 due to the current flowing through glow discharge device 19 and through equal resistances 17 and 18 and the potentiometer 14. This is shown in the graphical illustration of Figure 2 at the point where curves 40 and 41 intersect. By moving the variable tap on the potentiometer 14 towards the end which is electrically closer to the control electrode of electron tube 3, and termed the 0% resistance end in Fig. 2, the potential applied to the control electrode of electron tube 3 follows the curve 41 while the potential on the control electrode of electron tube 5 follows the curve 40. In like manner, when the variable tap on potentiometer 14 is moved toward the electrical end of potentiometer 14 nearest the control electrode of electron tube 5, the potential on the control electrode of electron tube 3 will increase as shown by curve 41 while the potential on the control electrode of electron tube 5 will decrease as shown by curve 40. A suitable choice of resistances 16, 17, and 18 and potentiometer 14 results in electron tube 3 being substantially cut off when electron tube 5 is fully conducting, and electron tube 5 being substantially cut off when electron tube 3 is fully conducting.

Thus, it is seen that the glow discharge device 19 forms a satisfactory means for providing control electrode biasing potentials when connected to the biasing network in accordance with the principles of the invention. This is only one of the functions of the glow discharge device 19 according to the invention, however. Through the novel use of a glow discharge device in accordance with further principles of this invention, transient conditions resulting from a variation of the position of the variable tap on potentiometer 14 and other low frequency transient disturbances may be suppressed. Typical operations under which such transient conditions may arise are lap-dissolve and other signal level changes. Considering the function of the glow discharge device 19 in combination with the biasing network; it will be appreciated that the action of glow discharge device 19 tends to hold substantially constant the potential difference between the junction between the anodes of electron tubes 3 and 5 and the point of connection between resistances 17 and 18.

The operation of a glow discharge device is shown and described in "Applied Electronics" by the Electrical Engineering Staff of the Massachusetts Institute of Technology at page 144 to 150. Particular attention is directed to the graphical illustration on page 149 of the publication where various curves are shown representing voltage versus discharge current of a glow discharge device.

When a low frequency disturbance of transient signal appears across resistance 11 due to a variation of the tap on potentiometer 14, or is applied to the control electrode of either electron tube 3 or tube 5 or to both because of a disturbance in some other portion of the circuit, this disturbance appears amplified in the anode circuit across capacitance 10 and resistance 8. Relatively high frequency signals of the order of the video signal have little effect upon the voltage in the anode circuit due to the low impedance path provided by capacitance 10. However, as the frequency of the signal decreases, the capacitance 10, in combination with resistance 8, provides an increasing impedance to the signal. Thus, low frequency disturbances tend to vary the potential on the anode of glow discharge device 19. Glow discharge device 19 couples these low frequency disturbances to the serial connection between resistances 17 and 18, and hence to the control electrodes of electron tubes 3 and 5. Thus, an increase in anode potential of electron tubes 3 and 5 tends, through the action of glow discharge device 19, to raise the control electrode potential which in turn tends to decrease the anode potential of electron tubes 3 and 5. In one embodiment of the invention, it was found that through the application of the principles of the present invention the variation of the cathode potential was made less than 0.1 volt for slow operation of the variable tap on the potentiometer 14, and about 0.3 of a volt for a more rapid operation of the variable tap on the potentiometer 14.

The output of the lap-dissolve unit 7 appearing at terminal 12 is applied to a conventional video amplifier

20. The amplified video signal from the video amplifier 20 is periodically restored to a suitable level of D.-C. potential by means of a clamping circuit 21. The video signal from the clamping circuit 21 is amplified by another video amplifier 22, and then applied to a conventional modulator 23 and, in turn, to a television transmitter 24 which is adapted to radiate television signals by means of the antenna 25.

Figure 3 shows a circuit diagram of an embodiment of the present invention in which the output is taken from the anode of electron tube 26 thus appearing at terminal 27. A video signal applied to terminal 28 is coupled to the control electrode of electron tube 26 by capacitance 29, and the cathode of the electron tube 26 is connected to ground reference potential by means of a resistance 30. The control electrode of electron tube 26 is connected to a voltage divider comprising resistances 31 and 32 which are connected serially between the control electrode and ground reference potential.

The anode of electron tube 26 is connected to another voltage divider comprising a resistance 33 and a resistance 34 which are serially connected between the anode and a terminal 35 to which may be applied a suitable source of operating potential. A capacitance 36 maintains the serial connection between the resistances 33 and 34 at A.-C. ground reference potential for signal frequencies of the order of that applied to terminal 28.

The glow discharge device 37 functions in a similar manner to that shown in the embodiment of Figure 1, thus maintaining the serial connection between resistances 33 and 34 at a substantially constant potential difference with respect to the serial connection between resistances 31 and 32. This provides a suitable biasing potential for the electron tube 26 and compensates for any low frequency disturbance appearing along with the signal at terminal 28.

By suitably proportioning the component values, the gain of the video amplifier of Figure 3 may be made to remain substantially constant over a band of frequencies above some selected low frequency and below this frequency to cutoff more sharply than is possible by means of a simple resistance-capacitance network.

The output may be taken from the anode circuit by choosing a suitable value for resistance 33 or it may be taken from the cathode, in which case resistance 33 should be reduced to a small value approaching zero. For video amplifier service, the resistance 32 should be of the value of 5,000 ohms or more, and should be at least five times the resistance of resistance 33.

While it will be understood that the values of the circuit components may vary to suit the requirements of a particular application, the following values are given for the components of the lap-dissolve unit 7 of Figure 1 which has operated successfully. These values are given by way of example only.

| | |
|---|---|
| Electron tube **3** | Triode section of type 5687. |
| Capacitances **4** and **6** | 0.1 microfarad. |
| Electron tube **5** | Triode section of type 5687. |
| Resistance **8** | 12,000 ohms. |
| Capacitance **10** | 1.0 microfarad. |
| Resistance **11** | 2,000 ohms. |
| Resistances **13** and **15** | 1.0 megohm. |
| Potentiometer **14** | 10,000 ohms. |
| Resistance **16** | 10,000 ohms. |
| Resistances **17** and **18** | 5,000 ohms. |
| Glow discharge device **19** | Electron tube type OA1 or OA2. |

Through the application of the principles of the invention it is apparent that a new and improved means for reducing the low frequency disturbances produced by transient switching, mixing, fading, or other operations is provided. Although the invention is shown in a television system, it will be understood that its application is not limited thereto.

What is claimed is:

1. A signal translating circuit including, a plurality of electron discharge tubes having cathodes connected in common, anodes connected in common and control electrodes, a first resistive element having a terminal connected to said anodes and another terminal, a second resistive element having a terminal connected to said cathodes and another terminal, means to apply energizing potential between said other terminals of said resistive elements, a glow discharge device having an electron collector connected to said anodes and an electron emitter, a plurality of resistance components connected individually to said control electrodes, further resistance components connected between the terminals of said plurality of resistance components remote from said control electrodes and the other terminal of said second resistive element, additional resistance components having given terminals connected in common to the electron emitter of said glow discharge device and other terminals connected individually to the individual junctions between said resistance components connected in circuit with each control electrode, means to apply signals individually between said control electrodes and a point on said second resistive element, and means to derive an output signal across said second resistive element.

2. A signal translating circuit including, a pair of electron discharge tubes having cathodes connected in common, anodes connected in common and control electrodes, a first resistive element having a terminal connected to said anodes and another terminal, a second resistive element having a terminal connected to said cathodes and another terminal, means to apply energizing potential between said other terminals of said resistive elements, a glow discharge device having an electron collector connected to said anodes and an electron emitter, a pair of resistance components having given terminals connected individually to said control electrodes and other terminals, a variably tapped resistance component connected between said other terminals of said plurality of resistance components connected in circuit with each control electrode, and means connecting the tap of said variably tapped resistance component to the other terminal of said second resistive element, additional resistance components connected between the electron emitter of said glow discharge device and the individual terminals of said adjustably tapped resistance component, a capacitor connected between said anodes and said second resistive element at the terminal remote from said cathode, means to apply signals individually between said control electrodes and a point on said second resistive element, and means to derive an output signal across said second resistive element.

References Cited in the file of this patent

UNITED STATES PATENTS

| | | |
|---|---|---|
| 1,973,082 | Koros | Sept. 11, 1934 |
| 2,420,058 | Sweet | May 6, 1947 |
| 2,434,939 | Levy | Jan. 27, 1948 |
| 2,485,665 | Shepherd | Oct. 25, 1949 |
| 2,610,260 | Moffett | Sept. 9, 1952 |

FOREIGN PATENTS

| | | |
|---|---|---|
| 621,465 | Germany | Nov. 7, 1935 |
| 479,936 | Great Britain | Feb. 8, 1938 |